(12) United States Patent
Laborelli

(10) Patent No.: US 7,660,208 B2
(45) Date of Patent: Feb. 9, 2010

(54) EQUIPMENT FOR THE OPTICAL PLAYBACK OF ANALOG PHONOGRAPHIC RECORDS

(75) Inventor: Louis Laborelli, Le Perreux-sur-Marne (FR)

(73) Assignee: Institut National de l'Audiovisuel - INA, Bry-sur-Marne (FR)

( * ) Notice: Subject to any disclaimer, the term of this patent is extended or adjusted under 35 U.S.C. 154(b) by 929 days.

(21) Appl. No.: 11/195,784

(22) Filed: Aug. 3, 2005

(65) Prior Publication Data

US 2006/0044988 A1    Mar. 2, 2006

(30) Foreign Application Priority Data

Aug. 12, 2004   (FR)   .................... 04 51841

(51) Int. Cl.
*G11B 11/00*   (2006.01)

(52) U.S. Cl. ................. 369/18; 369/112.01; 369/275.1

(58) Field of Classification Search ............. 369/44.11, 369/100, 53.19, 53.41, 107, 18, 84, 112.01, 369/275.1
See application file for complete search history.

(56) References Cited

U.S. PATENT DOCUMENTS

| 4,504,934 | A  | * | 3/1985 | Tanaka et al. | ................. 369/18 |
| 7,088,659 | B2 | * | 8/2006 | Hibino | ..................... 369/53.19 |
| 7,345,975 | B2 | * | 3/2008 | Fadeyev et al. | .......... 369/53.41 |

* cited by examiner

*Primary Examiner*—Ali Neyzari
(74) *Attorney, Agent, or Firm*—Young & Thompson

(57) ABSTRACT

This invention relates to equipment for the optical playback of sound media which includes resources (1) that has engraves grooves, (3, 9) for generating at least one light beam that presents a light spectrum variation according to its incidence angle on an area of the sound media and an image sensor (7) placed so that it recovers the light reflected by said area of the sound media.

20 Claims, 6 Drawing Sheets

EQUIPMENT FOR THE OPTICAL PLAYBACK OF ANALOG PHONOGRAPHIC RECORDS

This invention relates to the domain of playback of sound media, and in particular, analog phonographic records.

Normally, playback of this type of record is performed using a record player or "pick up," or a gramophone, which includes a mechanical playback cell equipped with a needle or a point depending on the profile of the grooves.

For over a century, since the advent of the phonograph at around 1880 and up to the arrival of magnetic tape and electronic or electro-optical media, the only method of sound recording was mechanical engraving. A large portion of the world's audio assets is thus preserved on 16-rpm, 78-rpm, 45-rpm, and 33-rpm records, and, for the oldest ones, on wax-coated cylinders. In order to allow utilising these treasured archives, playback solutions that are less aggressive than electro-mechanical phono cartridges are needed.

The project 21-64984.01 "VISUAL AUDITOR" by the Gebert Rüf Foundation and the Swiss National Sound Archives Foundation in Lugano, has allowed creating a non-contact optical playback solution that consists in obtaining an overall view of the image to archive an image of the records in the form of photographic film.

An electro-optical-mechanical player that includes a glass plate mounted on a rotating engine is used to digitize the image using a fixed linear 2048 pixel CCD camera, which captures the images at regular intervals (with frequencies that vary between 25000 and 200000 per rotation revolutions of the record.) This camera, combined with the rotation of the film on the glass plate, performs a rotational scan and provides a rectangular image of a record ring. Another engine then performs the radial movement of the record in order acquire the next ring.

Once it has been digitized, the groove image is processed and analysed in order to determine the position and movement of the groove. A first stage consists in correcting any imperfections in the acquired image. Image irregularities can indeed arise from the various stages of the acquisition process: the record itself (scratch, crack, dust, etc.), from the photograph, or from the scan (dust, optical issue, failed CCD sensors, etc.)

Then, the position of the groove is estimated using a simple thresholding technique or a more elaborated method.

The movement of the groove is therefore transformed into a sound signal. This signal is then processed using band-pass filter in order to only recover the bandwidth of the original recording. Some frequency weights could also be applied, depending on the type of original recording (for example: RIAA equalisation curve.)

Nevertheless, this known solution requires a set of relatively complex equipment and multiple handling that are not compatible with the serial digitization of sound archives that may contain several hundreds of thousands of records or media to be processed. This technique is sensitive to the irregularities on the record surface that are not detectable when listening to the record using traditional turntables and that can affect the quality of the sound extracted by this solution of the previous art.

The main defect in this system nevertheless lies in the fundamental limitation in the measurement of the position of groove border. Indeed, this border is located on the surface of the record and can be defined in an imperfect manner. The middle depth area often contains more information. Furthermore, it would be desirable to measure on a surface and not on a curve in order to limit the number of errors.

Furthermore, because the audio signal is encoded as a change in the direction of the groove, there must be a way to measure very small movements. An optical system that is only sensitive to the position of the border will naturally be limited by the resolution limit of the optical lens.

There is also U.S. Pat. No. 4,504,934, which describes an optical signal reproducing apparatus that analyses the beam reflected by the walls of the record grooves.

This patent describes a system based on lasers that uses a laser beam that sweeps the surface of a lens. The light beam that converges into a single point in the groove is only resent towards its initial direction at a given moment. The measurement of this specific moment gives access to the mirror angle that constitutes the groove.

European patent EP0247810B1 describes an optical turntable system designed to play back a phonograph record with a signal recorded in a groove that includes:

an optical unit that includes an optical source that forms an initial descending light beam so that it forms a light mark on the first wall and a beam reflected by the wall forming a light mark reflected at a mark position that is proportional to the recorded signal, an optical sensor designed to detect the position of the reflected light mark and form an output signal that is proportional to the recorded signal, a tracking set designed to trigger the tracking of the groove by the light beam when the record turns, and a drive system designed to move the record with respect to the optical unit.

The tracking system includes a tangential unit equipped with a tangential detection device designed to detect the variation in the direction of a tangent at the groove and form a tangential error signal according to this variation; and it is equipped with a tangential tracking device controlled by the tangential error signal and designed to thus follow the light beam that is perpendicular to the tangent of the groove.

These solutions involve a complex tracking of the playback (reading) cell with respect to the disk groove or analysed media.

The purpose of the invention is to solve these different disadvantages by proposing a device for optical playback of a sound media (1) that presents a groove, which includes generation resources (3, 9) of at least one light beam that presents a light spectrum variation based on its incident angle on the area of the sound media and an image sensor (7) designed to acquire the light reflected by said area of the sound media.

Preferably, for a record, said spectrum varies in an angular sector placed on or in a plane supported in a variation plane of local normal vectors of one of the walls of the groove.

Advantageously, in order to sequentially encode the colors and/or intensity of the light, this spectrum is also discretely variable according to time.

According to a simple embodiment, these generation resources of at least one light beam include at least one filter, preferably a trichromatic filter that can generate said spectrum.

According to a specific embodiment, the generation resources include a white light source that lights a sound media area that includes several segments of the groove through a color filter with a color variation in a direction that is perpendicular to the optical axis of the incident beam and parallel to the record plane.

Advantageously, a condenser is also used to focus it on a light beam on the sound media surface in the form of a light mark that extends over several groove sections.

According to different embodiments, said condenser is composed of two aspherical lenses, a mirror and a lens, or two mirrors.

Preferably, it creates a light beam that forms an angle of approximately 45 degrees with the sound media surface, in a plane that passes through the rotation axis of the record.

Advantageously, the optical system includes a mirror for transmitting the reflected beam to the image sensor, which can be a two-dimensional or one-dimensional color camera.

In order to decode the light signal received, the equipment also includes a calculator connected to the output of said image sensor in order to ensure decoding of said image and to perform image processing to recover the radial movement speed of the sound media area according to the spectrum of the light reflected by said area.

The invention will be better understood by reading the description that follows, which makes references to the corresponding diagrams as a non-limiting example of an embodiment, where:

The part corresponding to the retake mirror, to the view acquisition lens, and to the camera is not represented, since it is identical to the previous one.

Figure 6:
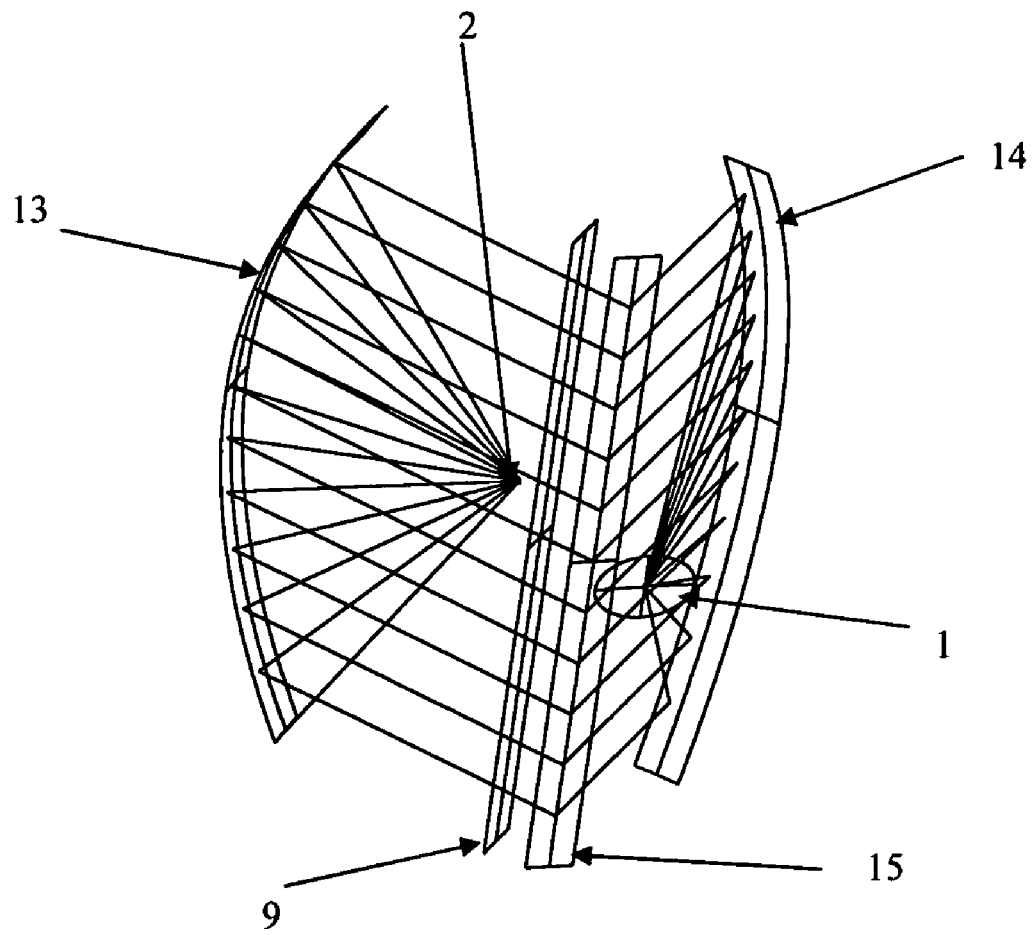

FIG. 6 represents a perspective view of the same assembly as the mirror condenser.

The equipment is designed to play back (read) phonographic records that have grooves formed laterally, with variations in the position of the wall with respect to a reference position that depends on the electric signal that controlled the engraving chisel. The groove has a radial deviation whose speed is proportional to the level of the recording electric signal. The combination of tangential rotation speeds of the record and the radial speed of the chiselling mechanism determines a local angle of the groove. To simplify things, if only the position of the groove on the horizontal axis that originates in the center of the record were to be measured, this position moves continuously to follow the spiral, with small variations that are encoded for the sound signal.

The tangent of the groove angle with this horizontal axis will therefore vary in proportion to the sound signal recorded on the record. The measurement of this angle by lighting up one of the faces of the groove that behaves like a mirror, through a structured light, allows the equipment according to the invention to recover the sound information recorded by the mechanical chisel.

The invention consists in encoding the incident light using colors, so that each point of the image of the groove presents a color that corresponds to the incident ray beam color reflected by the groove wall. This color will only depend on the angle of the groove wall with the direction of a ray beam originating from the center of the record.

Figure 1:
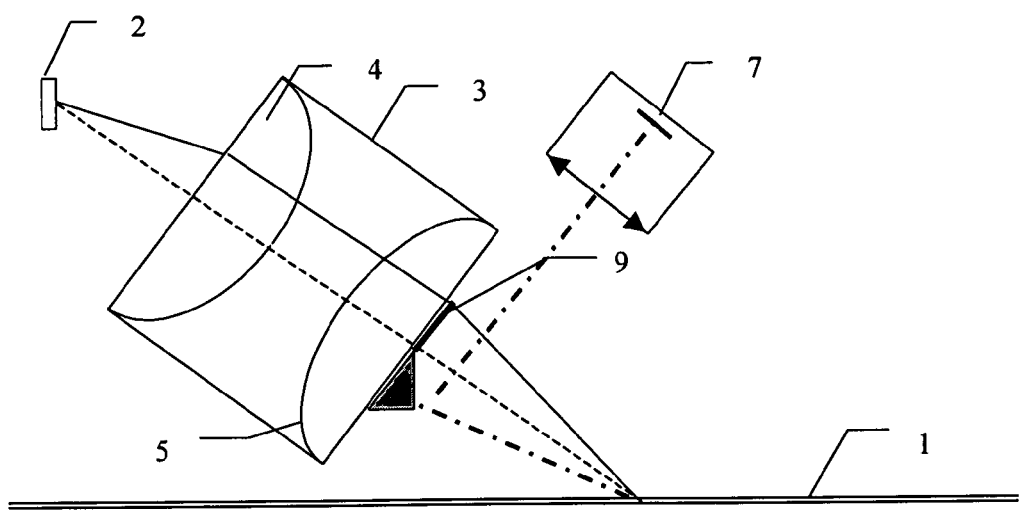
FIG. 1 represents a schematic view of the equipment according to the invention, a view of the general direction of the grooves.

FIG. 1 represents an embodiment example. The record (1) is placed on an optical head that includes a white LED (2) that emits a light beam that crosses an optical system (3.) This optical system (3) is formed by two aspherical lenses (4, 5) with a diameter of 75 millimeters and a focal length of 50 millimeters, forming a condenser. This important numerical aperture is determined in the maximum dynamic that can be decoded from the record.

This optical system allows projecting on the record surface a light mark according to an incidence angle of approximately 45 degrees. This mark is determined to receive several groove sections. The diameter of the mark is between 5 and 10 millimeters.

The field depth limits of the switched optical system are calculated according to the Scheimpflug rule, which allows placing the light source vertically, the (symmetrical) condenser at 45 degrees, and the record in a horizontal position.

The incident beam is color-coded by an optical filter (9) placed along the incident optical path. This optical filter has a continuous or discrete color variation depending on the general direction of the grooves. Preferably, this filter will be designed to present a continuous variation of the hue according to the HSI (Hue, Saturation, Intensity) model.

In this example, this filter is created using a transparent dye sublimation printer, the model Kodak KDS 8670 Dye Sublimation Printer.

The coded beam is reflected by the walls of the grooves present in the light mark formed on the record and sent by a recovery mirror (8) to a CCD camera (7) whose lens is focused on the record plane.

In this example, the sensor is a SONY HAD (commercial name) sensor with a resolution of 640×480, attached to an f1.8/50 mm optical lens. The optical lens is diaphragmed so that it projects on the sensor a sufficiently focused image. The video output is connected to a computer using a non-compressed IEEE1394 link, with a dynamic of 8 bits.

The image sensor is attached to an optical lens, and the entire assembly forms a capturing system.

The focusing of the image can be ensured with a diaphragm that is more open using the Scheimpflug rule in which the optical lens plane, the sensor plane, and the record plane are intersecting into a single straight line. Of course, this rule is only applicable if the sensor is compatible with the ray beam incidence.

In this example, the media is moved periodically in order to proceed with the capturing of the entire surface using a computer-controlled turntable, placed on another translation turntable.

Figure 2:
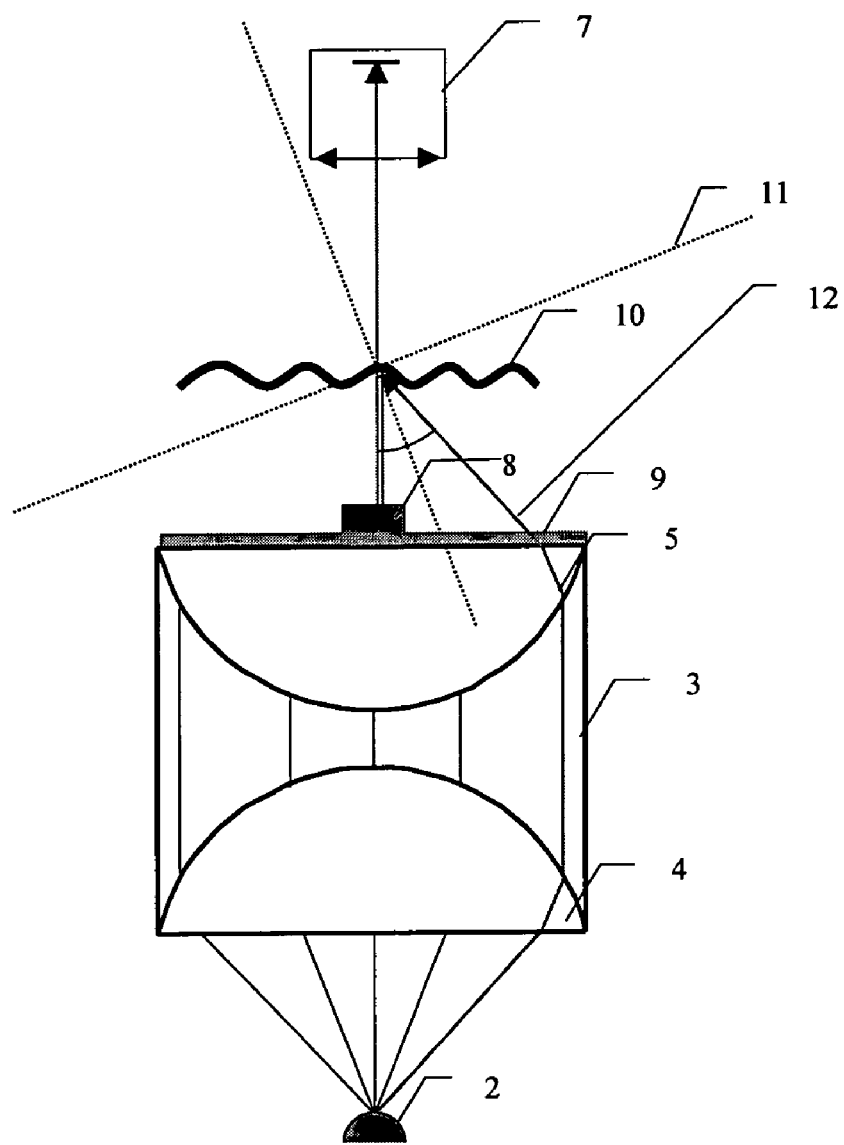
FIG. 2 represents a schematic view of the equipment, viewed in a plane that is parallel to the lighting optical axis and to the general direction of the grooves.

FIG. 2 represents the same embodiment example viewed from above at 45 degrees, in a plane that is parallel to the optical axis of the lighting and to the general direction of the grooves. To help in understanding this, the camera and its lens are represented in a side-view on the diagram, and not in a rear view. This figure shows the beam (12) colored by the filter (9), reflected on a groove wall (10) whose direction is represented by the tangent (11), and returns to the recovery mirror (8) that will send it to the camera (7) that includes a lens and CCD sensor.

Only this particular beam will be selected by the groove in this specific location. Another local direction of the groove would have reflected another ray beam, with a different color and originating from another location of the colored mask (9).

Figure 4:
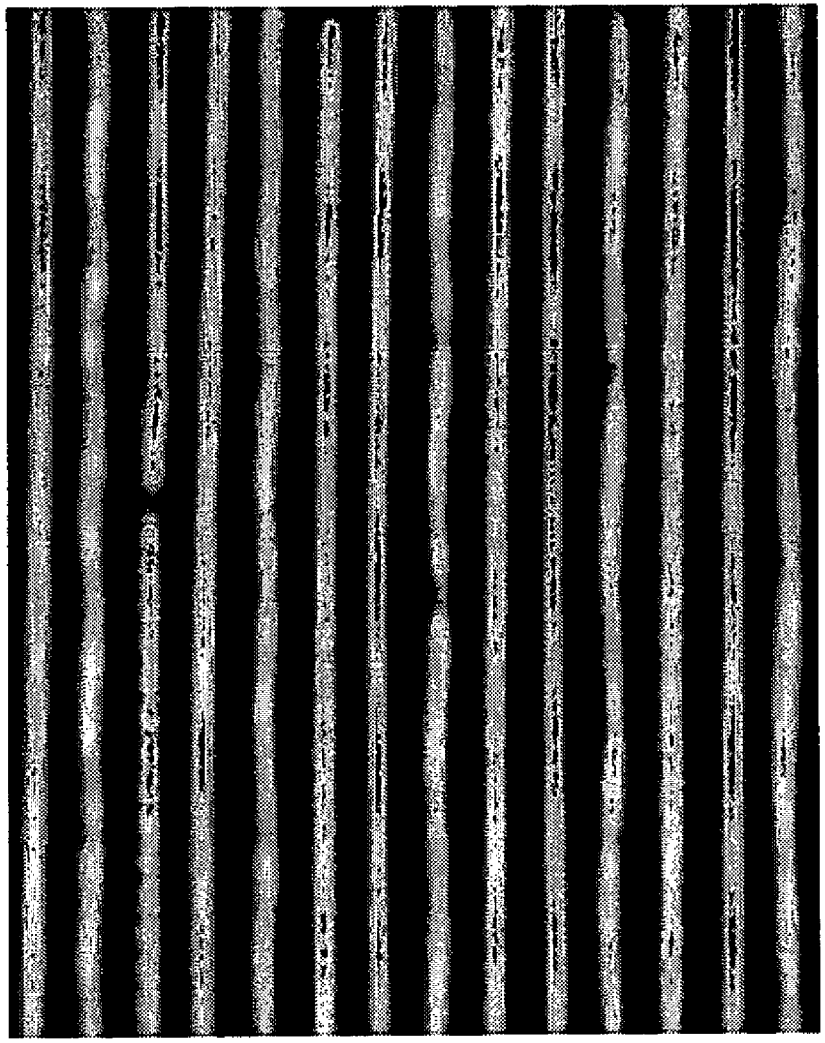
FIG. 4 represents a view of the surface of the sound media obtained by the lens condenser device.

The image obtained is represented in FIG. 4. The color directly encodes for the local direction of the groove, with, for example, yellow for the movement in one direction and blue for the movement of another direction. The colored filter (9) presents, in this case, a continuous chromatic variation, green corresponds to the average reference position.

Of course, filters with a more or less fast angular variation of the color can be created.

The deviation between the grooves is approximately 300 microns, and the smallest vertical details are approximately 50 microns. The record moves at a speed of approximately one meter per second along the peripheral, the possible sampling rate is approximately 20000 samples per second; that is, a cut-off frequency of approximately 10 kHz.

The decoding of the colored image thus obtained is performed by an image process that recovers the radial movement speed based on the hue of the groove.

After spatial filtering for noise reduction, the calorimetric analysis at all the points of the groove by this same model provides the hue, which itself allows obtaining the radial movement speed.

The filter (9) position on the optical path is taken into account during this conversion, which provides the incidence angle based on a formula that depends on the position of the imaged point and on the position on the filter.

The software application follows the track of a groove and decodes the groove over a fraction of the circumference.

In this example, the images are obtained using a two-dimensional camera; the sound signal obtained is merged with the sound signal obtained during the previous images, by taking into account the angular movement of the images.

In another implementation, the rotation movement can be continuous to allow acquisition by the line camera (one-dimensional) that will then capture an annular portion of the record by rotating the turntable.

The signal is re-sampled in order to take into account the tangential speed that is different at the center and along the periphery of the record, then passed through a recovery filter in order to correct the effect of the RIAA or other pre-accentuation.

A lighting attenuation of the signal can be interpreted as an occlusion of the light beam at the groove level, due to dust or a scratch, for example.

The software application detects these irregularities and retains the position. This allows subsequent restoration by interpolation of the missing sections.

The invention described in detail above relates to equipment for the optical playback of a sound media with groove engraving, including resources for generating at least one light beam that presents a light spectrum variation based on its incidence angle over an area of the sound media and an image sensor for acquiring the light reflected by said area of the sound media.

Advantageously, the invention therefore uses deflectometry to identify the local geometry of a record groove wall. Attributing a form of code (colored or other) to each different incident direction, allows obtaining on the recorded images the data for calculating, on the pixel in question, the angle of the normal of this wall with respect to a vertical plan that passes through the center of the record.

These angles can be measured not on a specific reception point of a localised laser beam, but on an extended area of the record. Thus, a tracking of the groove is made superfluous, or rather, sent to the captured image analysis phase. The advantage of the procedure is particularly obvious in the processing of fragmented records where the retraction of the varnish and the appearance of fractures prevents the groove from being aligned from one side of the fracture or another, and thus prevent simple tracking.

Furthermore, a collection of surface data allows measuring the groove wall at different heights, and thus facilitating the detection of dust and deformations due to a previous mechanical playback.

This data can be color-coded: in the sense that the reflected beam does not change hue during its reflection, the code will be maintained; the only influence of the reflection that affects the quality of light transmitted due to the presence of parasite elements such as dust that can obstruct the beam.

Furthermore, instead of lighting up the recording using a single colored beam in a single time period, the stages can be performed in an arbitrary fashion by changing the filter between stages.

Thus, the simultaneous encoding of three channels obtained by the colored filter can be made sequentially, with the advantage of being able to easily increase the number of channels, reduce the effect of chromatic aberrations of the optic lens, and thus obtain a more accurate digitization of the audio signal, as long as the record is correctly positioned on the device.

In fact, two filters are enough to encode the direction of a light beam that can be subjected to arbitrary attenuation by the reflecting record; in a specific example, one filter will be uniform and the other will have a monotone density variation. The combination of distinct images obtained using these two filters will allow the calculator to determine the direction of the reflector element by calculating a ratio, which does not vary by reflectivity.

Thus, we can move from a filter colored according to three RGB components to two or three monochrome filters used sequentially, or even more than three filters.

The additional filters can be used to increase measurement accuracy by presenting an angular variation profile that varies more quickly and by repeating this profile periodically. The ambiguity of the measurement is therefore increased by the previous measurements.

The integration of all the images obtained by the various filters of the calculator provides better accuracy. Below is a generalisation of this formalism on several filter measurements and using several filters.

More specifically, the filters created using a subtractive color system CMY (cyan, magenta, yellow) printer allows presenting, on each localised element, three distinct degrees of freedom, which correspond to the quantity of colorant applied locally.

The analysis of the color that results from an RGB trichromatic camera allows obtaining the initial C, M, and Y colors using a calibration matrix that depends on the lighting spectrum, the sensitivity of the camera in each RGB channel, and the absorption spectrum of the C, M, and Y colorants.

In a more general manner, a composite filter, produced from the superposition of two color filters produced with different colorants for example, can indicate more than three degrees of freedom.

The measurement of these extended colors or additional degrees of freedom can be obtained using a multi-spectral camera, or simply by applying successive separator filters placed in front of a black and white camera. For example, the choice of light sources with different emission spectrums can also allow measuring the n degrees of freedom of a point on the filter. Measuring the initial degrees of freedom allows obtaining the amount of a certain type of colorant present at a certain position on the filter. The measurement of these degrees of freedom allows obtaining the intersection position of the light beam with the filter. The position on the filter is singularly related to the incidence angle of the light beams measured by the optic lens, and therefore, the local geometry of the groove of the record, and thus, the recorded signal.

In more general terms, each measurement made by a black and white (B&W), Red-Green-Blue (RGB), or multi-spectral camera or by the change in light, will obtain a value of 1, 3 or n degrees of freedom. From the measurement area one passes to the area of the degree of freedom by linear transformation, if one supposes that the measurement is itself linear with respect to the lighting intensity received in the wavelength band.

The passage of several (p) different filters can multiply these degrees of freedom by p.

All these measured n×p degrees of freedom are therefore utilized to obtain an accurate incidence angle of the beam, by taking into account the arbitrary intensity reductions caused by dust. The normalization of the intensity consists in calculating, from the measurements converted into degrees of freedom, a vector that is made invariant with respect to the reflectivity coefficient of the surface and the overall efficiency of the lighting lens for a specific incidence angle.

This normalization of the intensity depends on the type of coding adopted: For example, one can perform normalization by a first degree of freedom that would have a constant value assigned by the reflectivity and other parasite elements, or making the norm of the vector of the degrees of freedom equal to one, or even choose a subset of the degrees of freedom with a unitary norm. The type of normalization depends on the type of lighting chosen: This refers to the separation of the reflectivity measurement of other measured degrees of freedom.

The normalization of the intensity will project a point of a measurement space with n×p dimensions, to a hyper-surface of n×p−1 dimensions embedded in this space, such as all the measurement points affected by a reflection intensity variation are found on the same projection. During this normalization, the intensity of the light received is retained in order to use it as a signal loss clue during subsequent interpolation.

After normalization, the residual n×p−1 degrees of freedom are used to obtain the alpha incidence angle of the optical beam, within the 45-degree incidence plane.

Each alpha angle corresponds to a distinct point on a curve that evolves in the space of complete degrees of freedom, on the hyper-surface of the standardised degrees of freedom by the light intensity.

This curve may be discontinuous by sections, or preferably follow a continuous path.

The coarse to fine, the pyramidal, the hierarchical, the Peano curve, the Hilbert curve or the Gray code approaches can each be seen as specific versions corresponding to different curves.

Identifying the position on the curve from degree of freedom measurements is a more or less complex problem depending on the chosen encoding, and thus the shape of the curve.

A simple example of this general approach reduced to the case of a single trichromatic filter, can be a curve that extends the RGB measurement space at a constant intensity, thus leaving the hue and saturation free. The filter itself is printed in CMY. During image playback, an RGB measurement by the camera is converted into the CMY space of the filter colorants by taking into account a calibration linear matrix, then into a hue, saturation, and intensity (H, S, I) model, then into the position on the curve. The intensity is ignored, which corresponds to making it invariant with respect to the variable reflectivity of the media (normalization stage.)

At a constant intensity I, (H, S) are found on the surface in the space of the degrees of liberty CMY.

In the space (H, S) a curve can be drawn configured by u (H(u),S(u)), by maintaining safety margins that depend on the quality of the acquisition camera and its signal-to-noise ratio in each R, G, and B component. This curve may be more complex than a simple variation of the hue H, and may include a variation of the saturation S.

In an example, the colored filter will be printed as a result of the function of a single hue variation of the parameter u along its major axis, by converting H(u) and S(u) into a variable C, M, and Y color density according to u.

The problem of decoding, after normalization the measurements obtained in the space of degrees of freedom, lies in finding the value of parameter u that provides the degree of freedom that is closest to the values standardised the intensity; u being directly related to the position on the filter and therefore to the direction of the light beam obtained on the record.

The change order of colored filters that modulate the spectrums in an angular manner, the change order of filters placed in front of the monochrome camera, and the change order of the light source are arbitrary, if each image is saved on the computer, and available for subsequent processing.

Similarly, the rotation movement of the turntable, the movement in the radial direction, can be chosen freely, and interlaced with the order of change of the lighting and of the spectrum measurement.

Nevertheless, the use of a specific record rotation measurement device can be avoided by compensating the images obtained using one filter with the images obtained with another filter, assuming that these two images are not statistically independent. This is obtained, for example, by choosing common degrees of freedom.

The change in filter for obtaining additional degrees of freedom may be performed using a mechanical device or using a light modulator controlled by the calculator (such as Texas Instruments' DLP micro-mirrors,) liquid crystal elements, or any other light spatial modulation device replacing the filters.

Other resources that modify the spectrum of the light projected on the record according to the incidence angle can be used as diffraction networks or prisms. A beam that diverges the continuously varying wavelengths from the network or prism may be made convergent on the part of the record lit up by the convergent optical element u.

The condenser may be replaced by a commercially-available video projector, according to an optical element that makes the beam to the record convergent.

Furthermore, according to the invention, a condenser is preferably used in order to produce, on the record, an incident beam according to a 45-degree angle with the normal of the record, so that it is reflected by a groove wall towards the optic lens.

In the direction of the coding by one or several filters, the numerical aperture must be as large as possible. The structured light beam must therefore have the same form of angular sectors, whose main peak lights up a point on the record; the base comes from the condenser, and these sectors are placed on the planes at 45 degrees with respect to the record plane. The colored coding or the structured variation of the light intervenes according to the angle registered in these sectors.

An embodiment using a refractive or reflective circular symmetry condenser is an approximation of the desired light distribution, in the sense that the ray beams will not be on the parallel planes, but rather, will converge from the correctly closed exit pupil of the last lens/mirror of the condenser. It is the relative size of the minor axis with respect to the major axis of the exit pupil that determines the angular shape of the ray beam that lights the record.

The Scheimpflug rule allows ensuring the convergence of beams on the tilted plane of the record (here approximately 45 degrees.) A symmetrical embodiment of the condenser allows limiting certain optical aberrations.

A version can be made based on condenser mirrors or catadioptrics using spherical, parabolic, or aspherical mirrors in the general sense, one or two lenses being replaced by a mirror.

The advantage of an embodiment that is only based on mirrors is that chromatic aberrations are eliminated more easily.

In the case of an embodiment based on mirrors, in order to prevent placing the light source on the return path of the mirror, the record lighting can also be made using an off-axis mirror; that is, a cut rectangular straight band in a parabolic mirror, by distancing the optical axis of this mirror.

The major axis of this rectangle covers the entire exit pupil. The minor axis is determined by the constraint of reflecting all the beams of the source according to a limited angle interval on the groove, in the direction that is orthogonal to that of the sound encoding.

In such an assembly, the record will be lit up at the focus of the second mirror, the one that receives the parallel beam of the first one, which in turn, is lit up by the source at its focus.

The two focuses are moved from one side of the axis joining the two mirrors to the other by using off-axis type mirrors.

Such an assembly can only be used for an isolated record element because the axis between the two mirrors placed facing each other in a concave manner pass by the record, and therefore are obscured by the record. In the case of a real record, the assembly is folded using a plane mirror placed near the record surface, which prevents the light from crossing the record plane.

It can be noted that the light on the diagram only arrives correctly in the form of an angular sector on the incidence plane. The deviation with respect to the plane increases according to the mirror aperture and the distance of the section or parabolic mirrors with the axis of these. This effect can be reduced by replacing the parabolic mirrors with their analogues in the form of Fresnel mirror; their macroscopic shape is flat and therefore they present microscopic details that orient the light to the parabola focus.

The extended light source will be directed in order to comply with Scheimpflug conditions and focus an image by the beams that arrive with an incidence of 45 degrees on the record. This corresponds to a source on the vertical plane.

Figure 5:
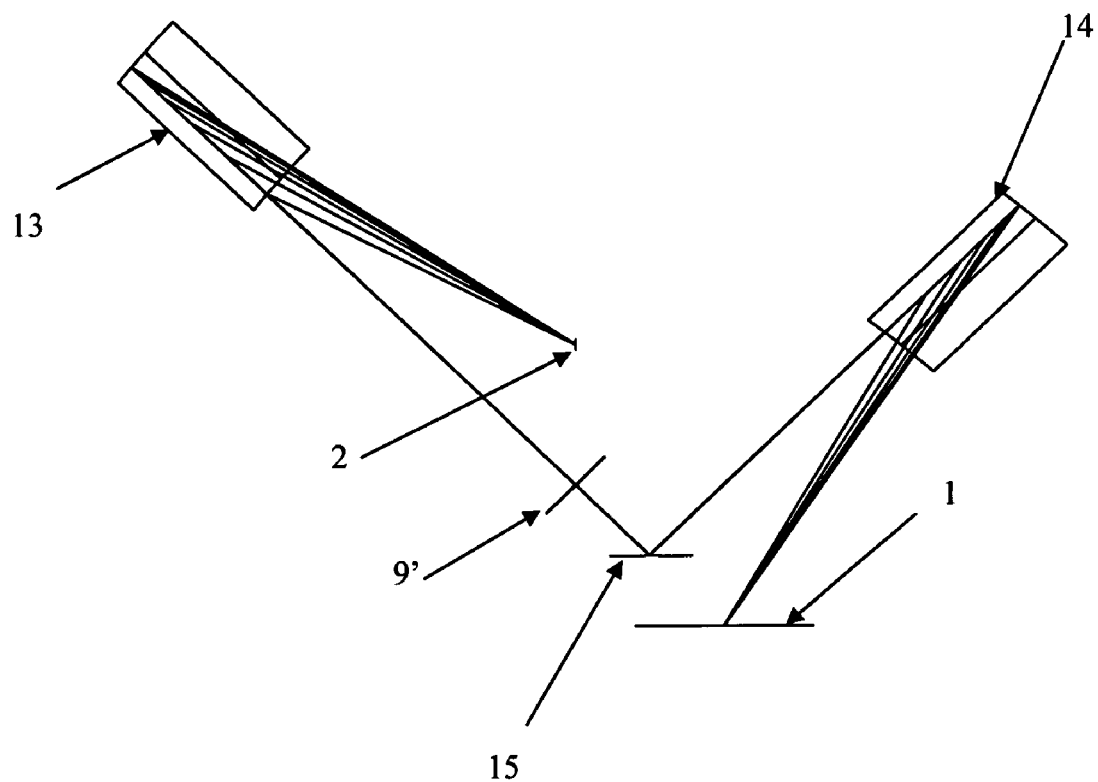
FIG. 5 represents a schematic view of the ray tracing in an embodiment with a condenser composed of two parabolic mirrors and a plane mirror, projecting the image of the vertical source on a horizontal record, with an incidence angle of 45 degrees and limiting itself to the useful part.

FIGS. 5 and 6 represent an embodiment of a condenser using two parabolic mirrors (13) and (14), reduced to a straight window according to a minor axis, and wide according to a major axis carrying the structure light encoding, as well as a plane mirror (15), and a colored filter (9').

FIG. 5 is a horizontal view of the condenser at the record level; the record being horizontal. On this figure, the sections of the parabolic mirror (13) and (14) are viewed from the side.

FIG. 6 is an isometric projection of the condenser; the observer is placed slightly higher and to the side of the record (1).

On this figure, the concavity of the parabolic mirrors (13) and (14) can be distinguished.

These parabolic mirror sections are obtained by an off-axis cut of the mirror in the direction of the minor axis of the rectangular window. Thus, a beam from the focus where a light source (2) will be placed will be reflected in the form of a parallel spread, without coming into contact with the light source along its path after reflection.

The beam spread therefore comes across a rectangular plane mirror (15), whose shape is similar to that of the colored filter, placed on top of the record and parallel to it. This plane mirror will reflect the light to a second parabolic mirror (14). For a specific source at the center of the optical axis, the parabolic mirrors can be placed at an arbitrary distance from each other.

The colored mask (9') is placed on the optical axis, preferably at an equal distance from the mirrors (13) and (14).

The beam spread is then taken by an element of the off-axis parabolic mirror (14), which re converges it on the point that needs to be lit on the record (1), at the focus of this second parabola.

The use of off-axis type mirrors can be avoided by slightly turning each mirror so that they face each other. A Z-type assembly, which allows compensating the coma aberrations, is known in the status of the art of Schlieren-type systems such as those described, for example, in the publication "Schlieren and Shadowgraph Techniques, G. S. Settles, ISBN: 3540661557."

In both reflector and refractor cases, only a single thin rectangular band of the exit pupil of the condenser is useful. The elimination of the surplus section allows placing the condenser as close to the record as possible, and therefore obtaining the strongest numerical aperture in the modulation direction (the major axis of the rectangular pupil.)

Figure 3:
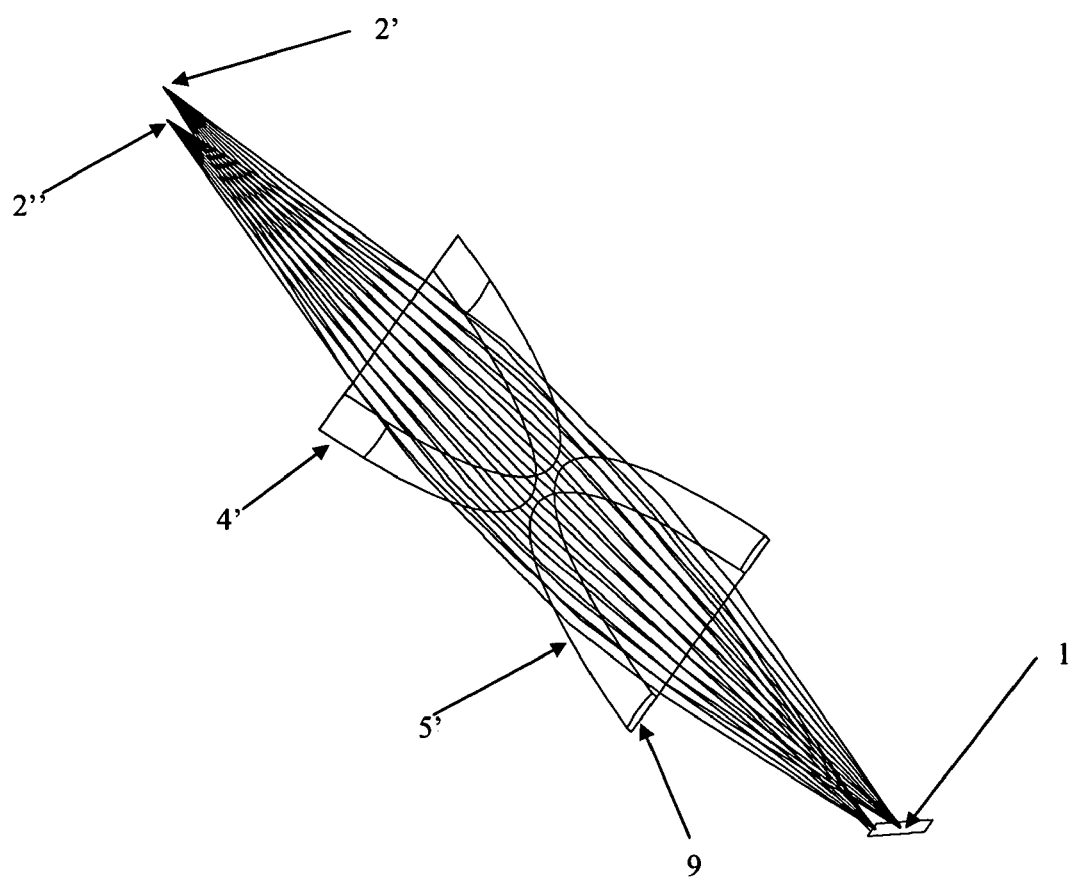
FIG. 3 represents a view of the ray tracing in an embodiment with a condenser composed of two lenses, projecting the image of a vertical source on a horizontal record, with an incidence angle of 45 degrees, limited to the useful part of the lenses.

FIG. 3 shows a trace of ray beams of the refractor condenser in FIG. 1 reduced to its useful part. The record (1) is placed under an optical head that includes a white LED (2) that emits a light beam that crosses an optical system (3). This optical system (3) is composed of two aspherical lenses (4, 5) that form a condenser.

Two distinct points (2') and (2") of the source are represented here to illustrate the Scheimpflug rule.

The colored filter placed here under the last lens is a rectangle. In the direction of the short side, the color is constant. In the direction of the long side, the color presents a variation.

A traditional microscope condenser does not have the Scheimpflug type geometry nor does it have this numerical aperture asymmetry. Furthermore, the lens diameter of a microscopic lens with a sufficient numerical aperture in the modulation direction, used in the condenser, prevents 45-degree inclination. The specialised condenser according to the invention has a weak minor axis, and can therefore be tilted by 45 degrees.

A condenser composed of two lenses or two mirrors can be replaced, at the expense of the lower numerical aperture, by a single lens or mirror.

In a variant of an embodiment, a sufficient optical quality of the condenser will also allow it to be used for the coaxial capture of the reflected beam by limiting the numerical aperture of the image capture camera lens in the central area. Therefore, a semi-transparent beam splitter can then be used to separate the outward beam that lights the record, and the return beam to the camera; this beam splitter is placed after the colored filter in the direction from the light source. The colored filter in the case of the refractor with the beam splitter will therefore be placed in the interval between the two lenses, before the beam splitter. The capturing optical lens will therefore be composed of the reflective or refractive surface used by the condenser, and of another secondary surface chosen to limit optical aberrations. The last mirror or refractor element will be common to the condenser or to the capturing optical lens. Thus, the use of a recapture mirror (8) is avoided.

This recapture mirror can also be eliminated in an assembly without semi-reflective beam splitter if the physical size of the exit pupil of the condenser and the mechanical limitations of the system allow obtaining a direct view of the imaged record area, according to a symmetrical incidence at the light beam with respect to the variation plane of the normal of the selected wall of the groove. The camera will therefore be placed on the axis, without reflection by the recapture mirror, with an angle close to 45 degrees with respect to the record surface.

The invention claimed is:

1. Equipment for the optical playback of a sound media presenting a groove engraving, comprising:
   generation resources of at least one light beam configured to be reflected by an area of the sound media, and
   an image sensor placed in such a manner as to capture the light reflected by said area of the sound media, wherein said light beam presents a spectrum variation according to said light beam's incidence angle on said area of the sound media.

2. Equipment for the optical playback of sound media according to claim 1, characterised in that said spectrum varies in an angular sector placed on plane of variation of the local normals of one of the groove walls.

3. Equipment for the optical playback of sound media according to claim 1, characterised in that said spectrum is also discretely variable according to time.

4. Equipment for the optical playback of sound media according to claim 1, characterised in that said resources for generating at least one light beam include at least one filter that can generate said spectrum.

5. Equipment for the optical playback of sound media according to claim 4, characterised in that said filter is a trichromatic filter.

6. Equipment for the optical playback of sound media according to claim 1, characterised in that the generation resources include a white light source that lights up an area of the sound media, including several segments of the groove through a colored filter with a color variation in a direction that is perpendicular to the optical axis of the incidence beam and parallel to the record plane.

7. Equipment for the optical playback of sound media according to claim 1, characterised in that the generation resources include an optical system that forms a condenser for focusing it on at least one light beam on the surface of the sound media in the form of a light mark that extends over several sections of the grooves.

8. Equipment for the optical playback of sound media according to claim 7, characterised in that said condenser is composed of two aspherical lenses.

9. Equipment for the optical playback of sound media according to claim 8, characterised in that the diameter of said aspherical lenses is greater than the condenser focal length.

10. Equipment for the optical playback of sound media according to claim 7, characterised in that said condenser contains at least one curved mirror.

11. Equipment for the optical playback of sound media according to claim 10, characterised in that said mirror is an off-axis mirror.

12. Equipment for the optical playback of sound media according to claim 7, characterised in that said optical system is fitted so that it complies with the Scheimpflug rule.

13. Equipment for the optical playback of sound media according to claim 1, characterised in that it includes at least one light beam that forms an angle of approximately 45 degrees with the surface of the sound media, in a plane that passes through the record rotation axis.

14. Equipment for the optical playback of sound media according to claim 7, characterised in that the optical system includes a mirror for reflecting the reflected beam to the image sensor.

15. Equipment for the optical playback of sound media according to claim 1, characterised in that the image sensor is composed of a two-dimensional color camera.

16. Equipment for the optical playback of sound media according to claim 1, characterised in that the image sensor is composed of a single-dimensional color camera.

17. Equipment for the optical playback of sound media according to claim 1, characterised in that it includes a calculator attached to the output of said image sensor to ensure the decoding of said image and perform, through image processing, the restitution of the speed of radial movement in the sound media area according to the spectrum of the light reflected by said area.

18. Equipment for the optical playback of sound media according to claim 1, characterised in that it includes a capture optical system fitted so that it complies with the Scheimpflug rule.

19. Equipment for the optical playback of a sound media presenting a groove engraving, comprising:
    a light beam positioned to be reflected by an area of the sound media, and
    an image sensor placed to capture the light from said light beam reflected by said area of the sound media, wherein,
    said reflected light beam presents to said image sensor a spectrum variation according to the light beam's incidence angle on said area of the sound media, and
    the image sensor comprises a multi-spectral camera.

20. Equipment for the optical playback of a sound media presenting a groove engraving, comprising:
    a light beam positioned to be reflected by an area of the sound media, and
    a multi-spectral image sensor placed to capture the light from said light beam reflected by said area of the sound media,
    wherein said reflected light beam presents to said image sensor a spectrum variation according to the light beam's incidence angle on said area of the sound media.

* * * * *

UNITED STATES PATENT AND TRADEMARK OFFICE
CERTIFICATE OF CORRECTION

PATENT NO. : 7,660,208 B2  Page 1 of 1
APPLICATION NO. : 11/195784
DATED : February 9, 2010
INVENTOR(S) : Louis Laborelli It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1225 days.

Signed and Sealed this

Fourth Day of January, 2011

David J. Kappos
*Director of the United States Patent and Trademark Office*